United States Patent Office 3,389,102
Patented June 18, 1968

3,389,102
PROCESS FOR THE PRODUCTION OF CONCENTRATED AQUEOUS METHYLPOLYSILOXANE EMULSIONS CONTAINING ZIRCONIUM SALTS
Karl Schnurrbusch, Cologne-Flittard, and Walter Noll, Leverkusen, Germany, assignors to Farbenfabriken Bayer Aktiengesellschaft, Leverkusen, Germany, a corporation of Germany
No Drawing. Continuation of application Ser. No. 208,949, July 10, 1962. This application Sept. 29, 1967, Ser. No. 671,898
Claims priority, application Germany, Aug. 9, 1961, F 34,650
4 Claims. (Cl. 260—18)

ABSTRACT OF THE DISCLOSURE

Concentrated aqueous emulsions of methylpolysiloxanes free of Si-H bonds are prepared by emulsification in the presence of anion-active compounds such as fatty acids and $NH_3$ or morpholine salts thereof.

This application is a continuation of Ser. No. 208,949 filed July 10, 1962, now abandoned.

The present invention relates to the production of concentrated aqueous methylpolysiloxane emulsions containing zirconium salts, wherein methylpolysiloxanes free from Si-H bonds, which have a content of 1.8 to 2.2 methyl groups per silicon atom, are emulsified in aqueous solutions of zirconium salts in the presence of anion active compounds. The process according to the invention consists in preparing the emulsions at temperatures of more than 50° C. or warming them to temperatures above 50° C. for some time. The duration of warming the emulsions is in general suitability about 2 to 5 hours.

The methylpolysiloxane emulsions thus prepared are surprisingly more stable than the emulsions prepared at a lower temperature and also maintained at a low temperature after their preparation. The emulsions prepared in accordance with the invention can be readily diluted with water, and can be used in this form according to the normal method with condensation auxiliary agents, e.g., with tin salts or methyl-hydrogen-polysiloxanes, for rendering hydrophobic fibrous materials of the most diverse types, such as textiles, paper, or leather.

Examples of methylpolysiloxanes are α-ω-bis-hydroxy-dimethyl-polysiloxanes and α - ω - bis-trimethylsiloxy-dimethyl-polysiloxanes; they are conveniently employed in the form of solutions in organic solvents which are insoluble or only slightly soluble in water, e.g., in toluene, xylene, decahydronaphthalene, and/or chlorinated hydrocarbons. Emulsions with a particularly good hydrophobisation activity are obtained by the use of these α-ω-bis-siloxy-dimethyl-polysiloxanes or of mixtures of α-ω-bis-hydroxy-dimethyl-polysiloxanes and α-ω-bis-trimethylsiloxy-dimethyl-polysiloxanes having a viscosity between 500 and 20,000 cst./20° C.

As aqueous zirconium salt solutions, solutions can be used which are prepared by the usual method, for instance from zirconium oxychloride with the addition of sodium acetate; it is, however, recommended to make use of aqueous zirconium salt solutions which are free from strong electrolytes, for instance aqueous solutions of zirconyl acetate.

An anion active compounds, the fatty acids and their salts in particular have proved themselves useful, especially oleic acid and its salts with ammonia or morpholine.

Optimum values in respect of the stability of the concentrated aqueous methylpolysiloxane emulsions containing zirconium salts, and at the same time in respect of the hydrophobisation activity of the dilute emulsions, are obtained when the temperature of the heating to be effected in accordance with the invention lies between 60 and 70° C.

Concentrated aqueous polysiloxane emulsions containing zirconium salts which exhibit the favourable properties of the emulsions prepared in accordance with the invention, in respect of their stability as well of their behaviour during application for hydrophobisation, to a like extent, are not obtainable by methods previously known, based either on methylpolysiloxanes or on methylpolysiloxanes free from Si-H bonds.

The following examples are given for the purpose of illustrating the invention, the parts specified being by weight.

Example 1

200 parts of an α-ω-bis-hydroxy-dimethyl-polysiloxane with a content of 2 methyl groups per silicon atom and a viscosity of about 18,000 cst. 20° C. are dissolved in a mixture of 100 parts of toluene and 100 parts of decahydronaphthalene. The solution is then treated at room temperature, whilst stirring, with a solution of 63 parts of zirconyl acetate and 17 parts of morpholine oleate in 520 parts of water. The mixture is subsequently emulsified in a homogenisation machine, where the exit temperature is adjusted to 60° C. by limiting the cooling.

The emulsion thus obtained is more stable than an emulsion which had been prepared from the same components but where the exist temperature in the homogenisation machine had been adjusted to room temperature by cooling in the normal manner.

The difference in the stability of the emulsions becomes evident when the following comparative experiment is carried out: 170 ml. portions of the emulsions are each shaken in a horizontal direction in a bottle of 250 ml. capacity on a shaker machine for 2 hours. A test is then made whether the emulsions spread homogeneously as a thin layer onto a smooth surface. This is the case for the emulsion prepared with heating in accordance with the invention, but not for the emulsion prepared by the known method without heating. Thereafter, one portion each of the shaken emulsions is diluted with water in the ratio of 75:925, and it is established whether the diluted emulsions are free from oily or solid deposits and whether they run smoothly down a vertical glass wall. This is again true for the emulsion prepared in accordance with the invention and not for the emulsion produced by the normal method.

It is found that the emulsion prepared in accordance with the invention is equivalent to the emulsion produced by the normal method in bringing about a satisfactory hydrophobisation effect when the following comparative experiment is carried out: a 75 ml. portion of each of the emulsions is diluted with 925 ml. of water and treated with 1.25 g. of a methylpolysiloxane of the formula.

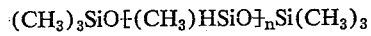

$(CH_3)_3SiO[(CH_3)HSiO]_nSi(CH_3)_3$ where $n$ has an average value of 30. Cotton fabrics are impregnated with the solutions, then squeezed out and heated to 160° C. for 5 minutes. During the test on the Bundesmann apparatus, the fabric which had been made hydrophobic with the emulsion prepared in accordance with the invention exhibits a drop fall time of 9.5 minutes and a water sorption of 15%; for the fabric which was made hydrophobic with the emulsion prepared normally without heating, the drop fall time amounted to 10 minutes and the water sorption again to 15%.

Example 2

The mixture specified in Example 1 is first emulsified at room temperature in a colloid mill, then heated at 70° C. for 5 hours, and subsequently further homogenised at room temperature for a short time in a homogenising machine.

The results of the spreading and run off tests, described in Example 1, are very good. A cotton fabric which had been made hydrophobic with the emulsion in accordance with the directions of Example 1 exhibits a drop fall time of 9.5 minutes and a water sorption of 16%. In order to render paper water repellent, 75 parts of the resultant emulsion are diluted to 1000 parts with water, subsequently treated with 1.6 parts of stannous chloride and the diluted emulsion is applied to the paper by the usual method by dipping, spreading, roll coating, or doctoring, and the paper is dried at 110–120° C.

Example 3

800 parts of an α-ω-bis-trimethylsiloxy-dimethylpolysiloxane, which contains 2 methyl groups per silicon atom and possesses a viscosity of 500 cst./20° C., are treated with 320 parts of white spirit and 80 parts of oleic acid. This mixture is then added with stirring to a solution which has been prepared at 70° C. from 320 parts of zirconium oxychloride, 36 parts of urea, and 80 parts of sodium bicarbonate in 100 parts of water. Subsequently, a solution of 140 parts of sodium acetate and 70 parts of glacial acetic acid in 1450 parts of water is added with stirring.

The mixture, which now shows a temperature of 25° C., is first emulsified at room temperature in a homogenising machine, then heated to 70° C. for 5 hours, and subsequently homogenised once more at room temperature in the homogenising machine for a short time.

The results from the spreading and run off tests described in Example 1 are satisfactory or good for the emulsion thus obtained, but are unsatisfactory for the emulsion prepared from the same components by the normal method without heating.

We claim:

1. In the process for producing concentrated aqueous methylpolysiloxane emulsions containing zirconium salts, wherein a methylpolysiloxane free from Si-H bonds and having 1.8–2.2 methyl groups per silicon atom, is emulsified in an aqueous solution of zirconium salt in the presence of an anion-active compound selected from the group consisting of fatty acid, and the corresponding ammonia and morpholine salts, the improvement which consists in heating the mixture of ingredients during emulsification to a temperature of more than 50° C.

2. In the process for producing concentrated aqueous methylpolysiloxane emulsions containing zirconium salts, wherein a methylpolysiloxane free from Si-H bonds, and having 1.8–2.2 methyl groups per silicon atom, is emulsified in aqueous solutions of zirconium salts in the presence of an anion-active compound selected from the group consisting of fatty acid, and the corresponding ammonia and morpholine salts, the improvement which consists in emulsifying the mixture of ingredients at room temperature, heating the resulting material at a temperature of more than 50° C. for about 2–5 hours, and subsequently subjecting the material to further emulsification procedure at room temperature.

3. A process for producing a concentrated aqueous methylpolysiloxane emulsion containing zirconium salts, comprising dissolving two parts of α-β-bis-hydroxy-dimethyl-polysiloxane possessing two methyl groups per silicon atom and a viscosity of about 1800 cst./20° C. in a solvent selected from the group consisting of toluene and decahydronaphthalene, treating the resulting solution with about five parts of an aqueous solution containing an active amount of zirconyl acetate and morpholine oleate and emulsifying the material at about 60° C.

4. A process according to claim 3 wherein the emulsification is first effected at room temperature, heating at about 70° C. for about five hours and thereafter homogenizing the resulting material at room temperature.

References Cited

UNITED STATES PATENTS 2,798,858  7/1957  Brown _____ 260—29.2
2,313,144  3/1943  Gumm _____ 260—29.2

OTHER REFERENCES

Emulsions, Theory and Practice, Becher, Reinhold, N.Y., 1957, pp. 209–210.

DONALD E. CZAJA, *Primary Examiner.*

C. W. IVY, *Assistant Examiner.*

UNITED STATES PATENT OFFICE
CERTIFICATE OF CORRECTION

Patent No. 3,389,102                          June 18, 1968

Karl Schnurrbusch et al.

It is certified that error appears in the above identified patent and that said Letters Patent are hereby corrected as shown below:

Column 1, line 56, "siloxy-" should read -- hydroxy- --.
Column 4, line 22, "1800" should read -- 18000 --.

Signed and sealed this 3rd day of February 1970.

(SEAL)
Attest:

Edward M. Fletcher, Jr.                   WILLIAM E. SCHUYLER, JR.
Attesting Officer                            Commissioner of Patents